United States Patent [19]
Bjalme et al.

[11] 3,872,748
[45] Mar. 25, 1975

[54] TOOL FOR BEVELLING PLASTIC PIPE

[75] Inventors: Bengt G. Bjalme; Thomas G. Brown, both of Erie, Pa.

[73] Assignee: Reed Manufacturing Company, Erie, Pa.

[22] Filed: Apr. 9, 1973

[21] Appl. No.: 348,962

[52] U.S. Cl. .................................... 82/4 C
[51] Int. Cl. ................................... B23b 5/16
[58] Field of Search ............. 82/4 C, 4 R, 4 A, 4 B, 82/4; 10/110, 123 P,

[56] References Cited
UNITED STATES PATENTS

| | | | |
|---|---|---|---|
| 761,071 | 5/1904 | Hanna, Jr. | 10/110 |
| 2,194,686 | 3/1940 | Berggren | 82/4 |
| 3,141,365 | 7/1964 | Peters | 82/4 |
| 3,273,432 | 9/1966 | Hasund | 82/4 |
| 3,540,328 | 11/1970 | Foss | 82/4 |
| 3,748,933 | 7/1973 | De Shazor | 82/4 |

*Primary Examiner*—Andrew R. Juhasz
*Assistant Examiner*—W. R. Briggs

[57] ABSTRACT

Plastic pipe is bevelled by a tool carried in a slide inclined at the bevel angle and fed toward the pipe end as it is rotated about the axis of the pipe.

3 Claims, 8 Drawing Figures

PATENTED MAR 25 1975 3,872,748
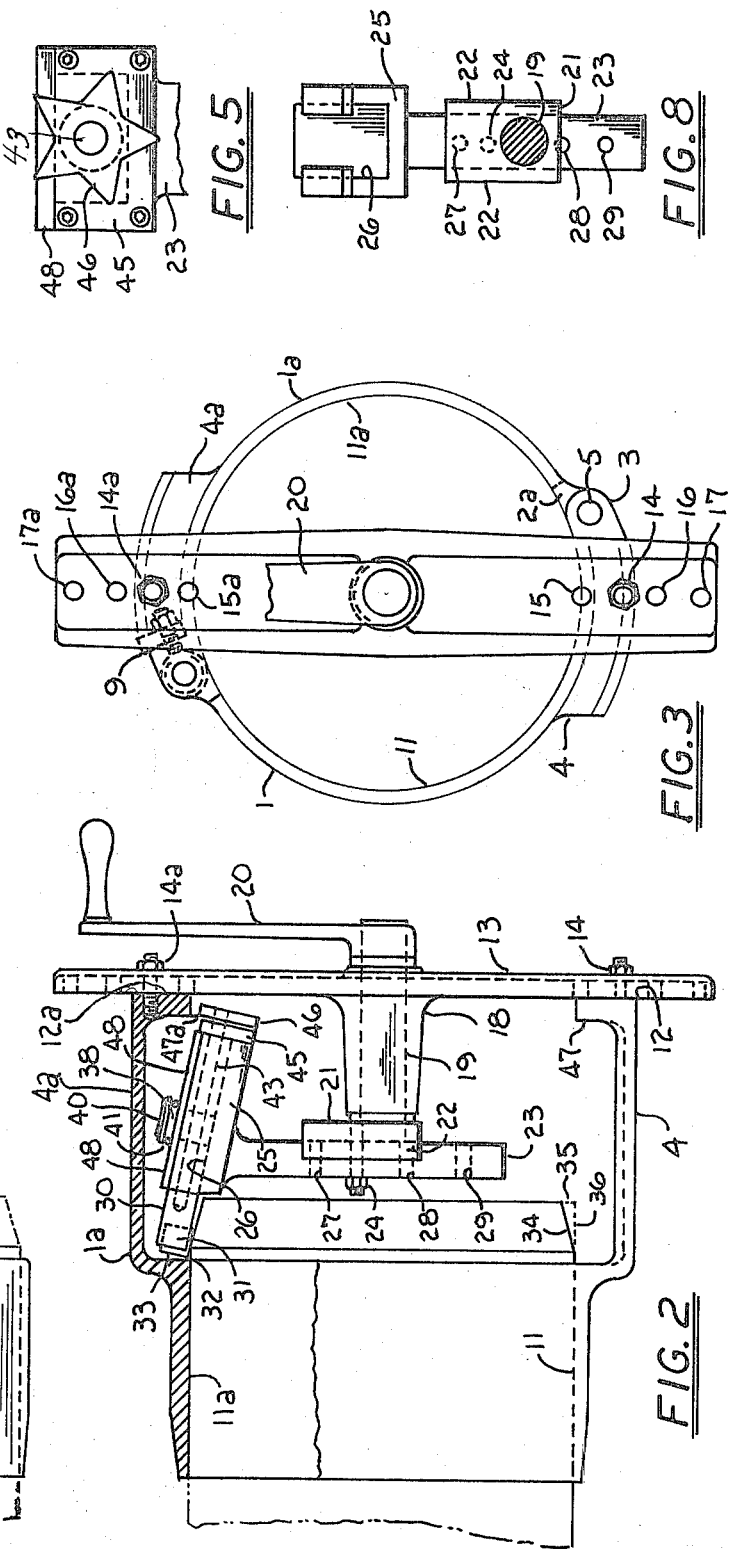

TOOL FOR BEVELLING PLASTIC PIPE

Before joining plastic pipe ends it is necessary that the pipe end be bevelled to guide insertion of the pipe end into the coupling. This invention is intended to facilitate the bevelling operation by feeding the tool in a slide inclined at the bevel angle. The cutting action always takes place at the entering tip of the tool and the load does not increase as the cut progresses.

In the drawing,

FIG. 1 is a side elevation of the frame of the tool;

FIG. 2 is another side elevation of the tool partly in section on line 2—2 of FIG. 1;

FIG. 3 is an end view of FIG. 2 with part of the handle broken away;

FIG. 4 is a plan view of the clamping connection between parts of the frame;

FIG. 5 is an end view of the tool slide and star wheel for feeding the tool bit;

FIG. 6 is a top plan view, partly in section, of the tool holder and slide;

FIG. 7 is a diagrammatic end view showing the operation of the quick release for the tool holder; and FIG. 8 is an end view of the tool head with the tool holder removed.

The frame comprises identical semicylindrical parts 1, 1a respectively having pairs of hinge knuckles 2, 2a at one end and 3, 3a at the opposite end, and an axially extending arm 4, 4a adjacent the knuckles 3, 3a. The parts of the frame are assembled end to end with one of the parts being rotated 180° with respect to the other part prior to assembly. The hinge knuckles 2a, 3 are permanently connected by a hinge pin 5 as shown at the bottom of FIG. 3. The knuckles 2, 3a are releasably connected by a bolt 6 having an eye 7 swivelled on a pin 8 extending between the hinge knuckles 2 and associated with a pressure plate 9 and nut 10 for exerting a clamping pressure on the knuckles 3a. The parts 1, 1a have semicylindrical bores 11, 11a which are clamped against a pipe end 12 by tightening the nut 10. The surfaces 11, 11a are machined to match the mean diameter of the outer surface of the plastic pipe to be bevelled and there is enough clearance between the knuckles 2, 3a and the pressure plate 9 to accommodate manufacturing tolerances in the pipe. There will be a frame 1–11a for each pipe size.

As shown in FIGS. 2 and 3, the axially extending arms 4, 4a extend radially outward of the surfaces 11, 11a and terminate in pads 12, 12a for a saddle 13 extending diametrically across the pads. The saddle is bolted to the pads by studs 14, 14a, tying the outer or free ends of the arms 4, 4a together to produce a rigid frame.

The saddle 13 is shown attached to the frame for pipe of intermediate diameter. The saddle is provided with a series of stud receiving holes 15, 16, 17 and 15a, 16a, 17a which permit use with frames for smaller and larger pipe sizes.

At the center of the saddle 13 is an axially extending hub 18 in which is journaled a shaft 19 fixed at one end to a handle 20 and at the other end to a radially extending channel or crank arm 21 having sides 22 straddling a radially extending rectangular shank 23 and having its bottom wall bolted to the shank by a bolt 24. The saddle is close to the hinge pin 5 and bolt 6 to minimize displacement of the shaft 19 due to variations in outside diameter of the pipe. At the outer end of the shank is an inclined tool head 25 having an inclined guideway 26. The shank is provided with a series of bolt receiving holes 27, 28, 29 for smaller and larger pipe sizes. The guideway 26 is inclined to the axis of the pipe at the bevel angle and guides the rectangular body 30 of a tool holder carrying an indexable bit 31 at its forward end. The bit is seated on its holder oriented to present a cutting tip 32 and cutting edge 33 to the pipe end to provide the necessary rake and clearance for efficient cutting of the plastic. In FIG. 2 the bit is shown at the end of the bevel cut after all of the material between lines 34, 35, 36 has been removed.

At the rear end of the body 30 is a half nut 37 in the lower end of a plunger 38 slidably carried in a socket 39 in the body. The plunger has a finger piece 40 extending out of the socket and held in the position shown in FIG. 7 by a coil spring 41. In this position the threads 42 of the half nut engage a feed screw 43 slidably received in a bore in the body. The feed screw is rotatably journaled in thrust relation to an end plate 45 fixed to the end of the head 25 remote from the cutting bit 31. On the outer end of the feed screw is fixed a star wheel 46 which cooperates with lugs 47, 47a on the arms 4, 4a to rotate the feed screw one tooth at each half revolution of the cutting head. At the end of the bevelling operation, the tool body 30 is returned to its initial position by pressing inward on the finger piece 40 of the half nut, moving the threaded portion 42 clear of the feed screw 43 so that the tool body can be retracted either by pushing on the finger piece 40 or on any accessible portion of the body 30. In the released position of the half nut, the finger piece 40 projects over the top surface of the top plate 48 fixed to the head 25 and the plunger 38 is received in a clearance slot 49 in the top plate.

In the use of the tool, the frame 1–11a is clamped to the pipe end with the portion to be bevelled projecting outside the gripping sections 11, 11a, the bit holder 30 is retracted in the head 25, the saddle 13 is fixed to the pads 12, 12a on the outer ends of arms 4, 4a and the handle 20 is rotated in a clockwise direction to advance the bit 31 into the pipe end by cooperation of the feed screw 43, half nut 37, lugs 47, 47a and star wheel 46. The bevel operation ceases when the cutting tip 32 of the bit runs out of the outer surface of the pipe. By loosening the clamping nut 10, the frame can be slipped off the pipe end and onto another pipe end of the same size.

What is claimed is:

1. A tool for bevelling a plastic pipe and comprising means for gripping the outer surface of the pipe with the end to be bevelled outside the gripping means, a frame radially outside and axially beyond said pipe end and fixed to said gripping means, a crank shaft journaled in said frame on the axis of the pipe and having a crank arm between the pipe end and the frame with a tool head fixed to the crank arm and rotatable thereby in a fixed plane normal to said axis, a guideway in the tool head inclined to said axis at the angle of the desired bevel, a tool in said guideway slidable in said guideway having a cutting edge presented to the pipe end, means for rotating the crank shaft, and tool drive means in thrust relation between said tool and said tool head and means to actuate said tool drive means for advancing the tool along said guideway into the pipe end for cutting the bevel.

2. The tool of claim 1 in which the gripping means comprises two parts hinged together on a pivot axis parallel to the axis of the pipe and having semicylindrical surfaces clamped against the outer surface of the pipe end by hinging about said pivot axis.

3. The tool of claim 2 in which the parts have arms extending axially beyond the pipe end and bridged by a saddle constituting the frame extending diametrically between the arms adjacent said pivot axis.

* * * * *